United States Patent [19]
Hirsch et al.

[11] Patent Number: 5,097,603
[45] Date of Patent: Mar. 24, 1992

[54] FINE ADJUSTMENT MEANS FOR INSTRUMENTS

[75] Inventors: Mordechai Hirsch, Nahariyya; Shalom Hirsch, Shavei-Zion, both of Israel

[73] Assignee: Noga Engineering Ltd., Israel

[21] Appl. No.: 588,188

[22] Filed: Sep. 26, 1990

[30] Foreign Application Priority Data

Dec. 28, 1989 [IL] Israel ............................ 92919

[51] Int. Cl.⁵ .................................. G01B 5/20
[52] U.S. Cl. ............................. 33/572; 33/838; 33/501.5; 248/904
[58] Field of Search ............. 33/572, 832, 838, 501.5, 33/613, 568, 573, 569, 568; 248/904, 124, 278

[56] References Cited

U.S. PATENT DOCUMENTS

| | | | |
|---|---|---|---|
| 2,258,175 | 10/1941 | Coleman | 248/904 |
| 2,456,003 | 12/1948 | Knutson | 33/572 |
| 2,506,924 | 5/1950 | Huber | 33/572 |
| 2,698,485 | 1/1955 | Johnson | 33/572 |
| 3,007,250 | 11/1961 | Fisk | 33/572 |
| 4,781,351 | 11/1988 | Parapetti | 248/904 |
| 4,813,152 | 3/1989 | Spencer | 33/832 |
| 4,896,857 | 1/1990 | McCullough | 248/904 |

Primary Examiner—William A. Cuchlinski, Jr.
Assistant Examiner—William C. Dowling
Attorney, Agent, or Firm—Brumbaugh, Graves, Donohue & Raymond

[57] ABSTRACT

The invention relates to fine adjustment means used with instruments which have to be finely aimed in a certain direction. The multi-directional fine adjustment unit comprises two discs held coaxially adjacent to each other by connecting means located along the axes of the discs and tilting means for tilting one disc relative to the other, wherein said tilting means are located in a circumferential annular track between the discs, and wherein said tilting means may assume any position along the track.

6 Claims, 4 Drawing Sheets

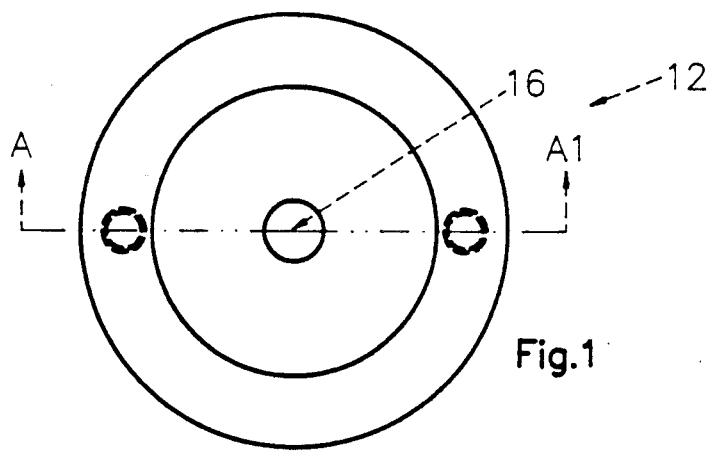
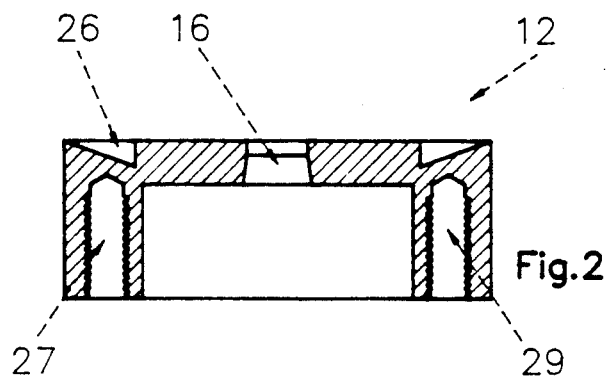
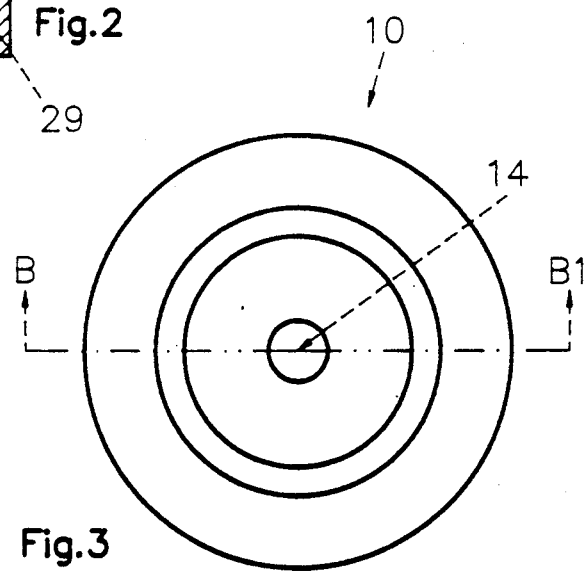
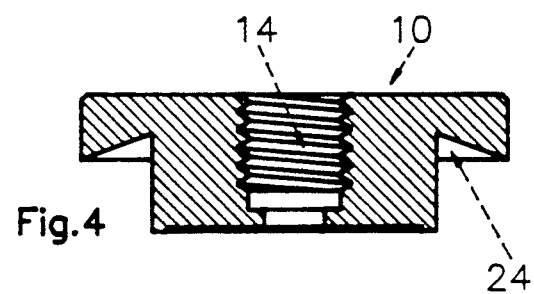

FINE ADJUSTMENT MEANS FOR INSTRUMENTS

FIELD OF THE INVENTION

The present invention relates to fine adjustment means, in particular the invention relates to novel fine adjustment means for instruments, which have to be finely aimed at a certain target, such as dial test indicators.

BACKGROUND OF THE INVENTION

Dial test indicators are used in the mechanical industries for aligning and measuring surfaces of parts, one relative to another. Dial test indicators are delicate instruments and, since their measuring range is limited, they must usually be brought close to the required surface to be measured. Dial test indicators are usually mounted on a measuring stand equipped with clampable arms and joints. Dial test indicators have at their end a movable contact tip. The positioning of the contact tip is controlled by a fine-adjustment feature, located on the measuring stand, usually at the base of the stand. The fine-adjustment feature enables one to bring the contact tip into contact with the surface to be measured, by a finely controlled movement.

Known dial test indicators are provided with fine adjustment means allowing to bring the contact tip of the indicator near the surface to be measured. However, the fine adjustment feature of known measuring stands, performs its movement in only one, predetermined direction, relative to the indicator. Therefore, it happens frequently that the fine adjustment moves the contact tip in a direction parallel to the surface to be contacted, instead of bringing it closer to it. When this happens, the fine adjustment feature is ineffective and only a change in the position of the base of the measuring stand of the indicator can restore the effectiveness. Changing the position of the base is a burden to the operator and in some cases is not feasible at all, due to the hindrance of other objects positioned on the working table.

SUMMARY OF THE INVENTION

In accordance with the present invention, there is provided a multi-directional fine adjustment unit comprising two discs held coaxially adjacent to each other by connecting means located along the axes of the discs and tilting means for tilting one disc relative to the other, wherein said tilting means are located in a circumferencial annular track between the discs, and wherein said tilting means may assume any position along the track.

The fine adjustment means of the invention are used with instruments which have to be finely aimed in a certain direction.

It is preferable to use the fine adjustment means of the invention to finely direct dial test indicators. However, the invention extends to other fine adjustments which can utilize the multi-directional means of the invention, such as with drilling or tapping machines for accurately directing small lubricant streams towards the point of action.

The annular track and the part of the tilting means located within the track are shaped so that when the discs are parallel to each other, the tilting means can easily rotate around the track, whereas when the disc is in the tilted position, the tilting means are fixedly held in one position along the track.

In accordance with a preferred embodiment of the invention, the annular groove is a dovetail groove produced by machining the lower rim of the upper disc and the upper rim of the lower disc.

DETAILED DESCRIPTION OF THE INVENTION

The invention is illustrated by way of example only with reference to the accompanied drawings in which:

FIG. 1 is a top view of a bottom disc according to one embodiment of the invention;

FIG. 2 is a cross sectional view of the disc shown in FIG. 1 alone the AA1 line;

FIG. 3 is a bottom view of a top disc to fit with the bottom disc of FIGS. 1 and 2;

FIG. 4 is a cross sectional view of the disc shown in FIG. 3 along the BB1 line;

Figure 5:
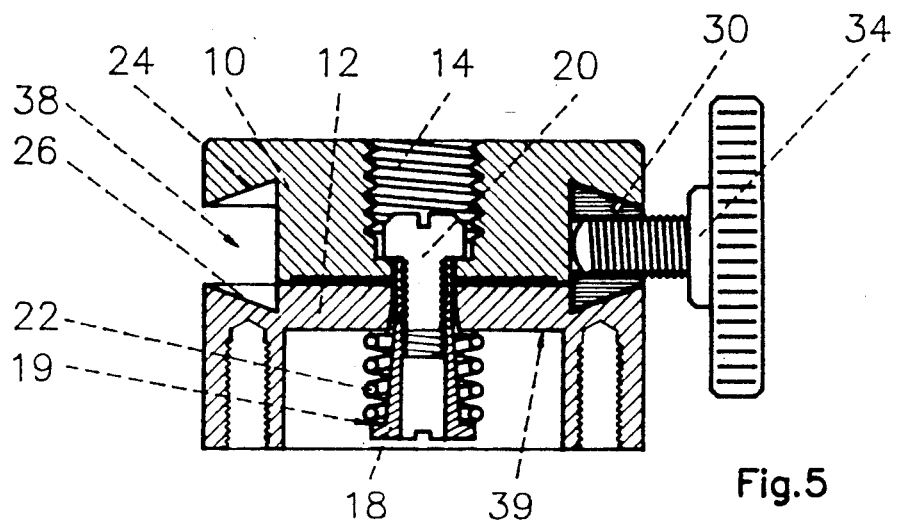
FIG. 5 is a cross sectional view of the fine adjustment unit comprising the discs shown in FIGS. 1 to 4.

FIGS. 1 to 6 show two round parts, numbered 10 and 12 in drawings, having the same diameter, part 10 being placed on top of part 12. Both parts have holes 14 and 16 respectively at their centers. The diameter of the top part of hole 14 is larger than the diameter of hole 16 and the diameter of the bottom part of hole 14. The upper part of hole 14 is threaded, as is clearly shown in FIGS. 4 to 6, in order to hold by means of screwing, a vertical rod holding an instrument which has to be finely aimed towards a certain direction. Bushing 18 acts as a restrictor holding discs 10 and 12 substantially concentric to each other. The external diameter of bushing 18 is slightly smaller than the diameter of holes 14 and 16 to allow the tilting of disc 10, as described below, without significantly deviating from the concentric position. A screw 20 fits into a threaded part of bushing 18, and rests on the bottom part of enlarged hole 14. A compression spring 22 is located between a step 19 on the bottom end of bushing 18 and the inner face 39 of part 12. Spring 22 presses parts 10 and 12 towards each other.

Parts 10 and 12 have respectively grooves 24 and 26 near their circumference which together form an annular, outwardly tapering dovetail track 38.

Wedge 30 is made from a ring which is formed as to exactly mate a section of the annular dovetail track 38. Wedge 30 has hole 32 through its center which is threaded, and screw 34 fits therein. When the point of screw 34 does not project from wedge 30, wedge 30 can run freely around the dovetail track. When screw 34 is turned further inwardly, the point 35 of screw 34 starts to press against wall 28 of dovetail groove 38, thereby forcing wedge 30 in an outwardly direction. This, in turn, forces part 10 into an oblique position relative to part 12. The angle between the two parts 10 and 12 is thus determined by the relative position of screw 34 within wedge 30.

Figure 7:
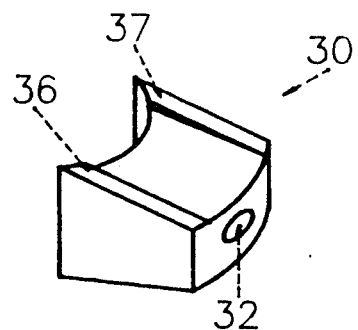
FIG. 7 is a perspective view of the wedge shown in FIGS. 5 and 6.

The direction of the obliqueness of part 10 depends on the original position of wedge 30, before it had been started to be pressed outwardly by screw 34. As shown in FIG. 7, wedge 30 is relieved in its middle, so as to assure that parts 10 and 12 rest on ends 37 and 36 of wedge 30. This is done in order to maintain stable and rigid contact between parts 10 and 12.

Bottom part 12 may be fastened to a baseplate by means of several threaded holes 27 and 29 on its bottom.

In actual use, the first step in setting up an instrument to be aimed, such as a dial test indicator, is to relieve screw 34, so that wedge 30 can freely run around dovetail groove 38. Then wedge 30 is brought to the desired rotary position and, subsequently, when screw 34 is turned inwardly, top disc 10 tilts in the desired direction relative to bottom disc 12.

Figure 6:
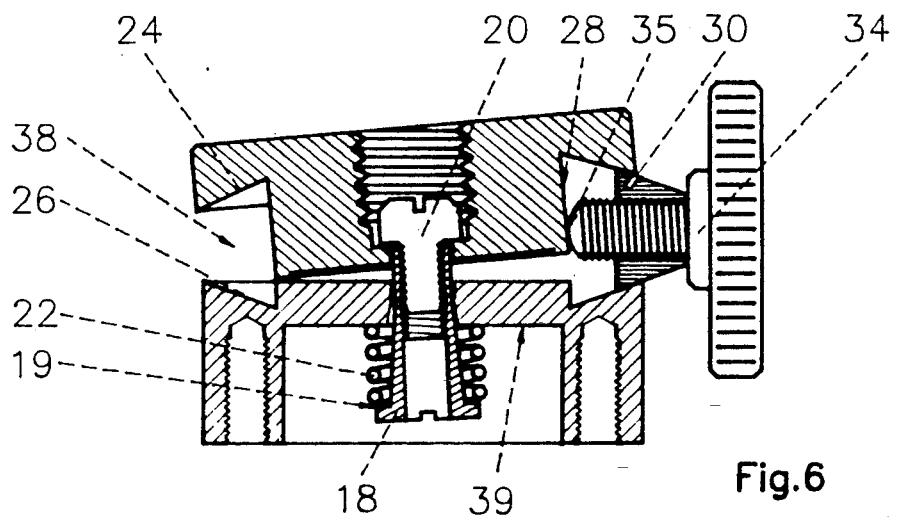
FIG. 6 is a cross sectional view of the fine adjustment unit shown in FIG. 5, in a tilted position.
Figure 8:
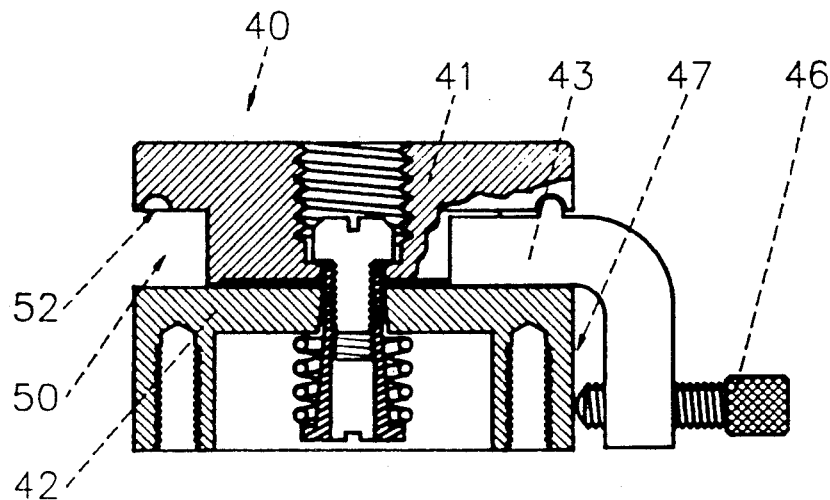
FIG. 8 is a cross sectional view of another embodiment of a fine adjustment unit according to the invention.
Figure 9:
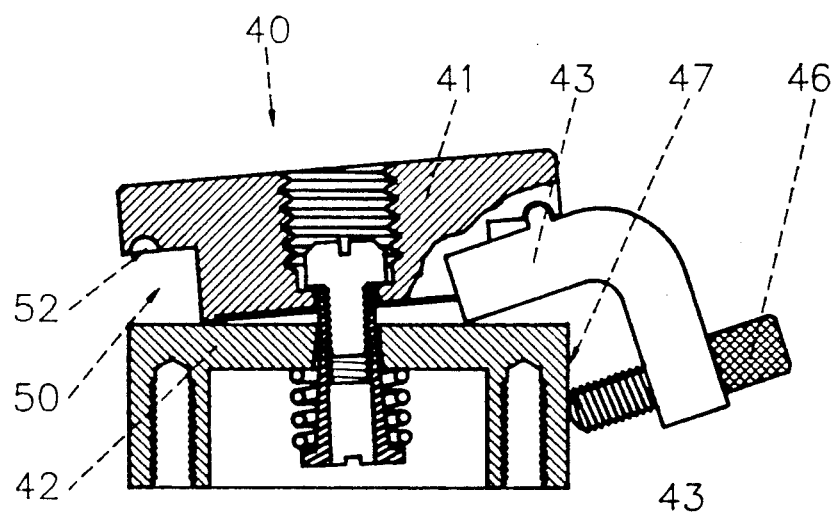
FIG. 9 is a cross sectional view of the fine adjustment unit shown in FIG. 8 when in the tilted position.
Figure 10:
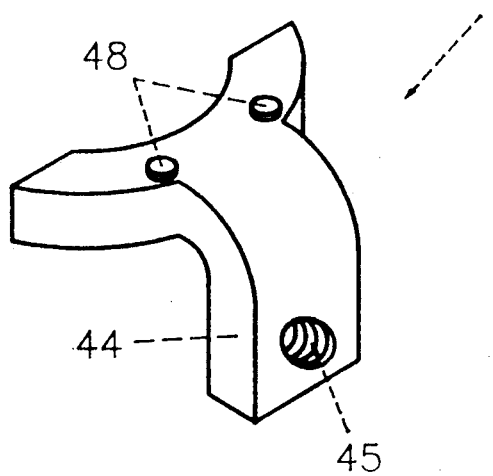
FIG. 10 is a perspective view of the lever shown in FIGS. 8 and 9.

FIGS. 8 and 9 show an alternative design of a fine adjustment unit 40 similar to the unit shown in FIGS. 5 and 6. Top disk 41 is similar to disk 10 shown in FIG. 5, except for the former having a differently shaped circumferential track 50, with a half round groove 52 at its upper wall. Bottom disk 42 has an entirely flat upper face. Bent lever 43, shown in detail in FIG. 10, can freely enter into track 50. Two small round headed pins 48 are pressed permanently into lever 43. Round pins 48 are to prevent lever 43 from falling out of track 50 and, at the same time, allow lever 43 to rotate freely around the axis of disks 41 and 42. Lever 43 has a bent leg 44, having threaded hole 45, into which a screw 46 can fit.

In the normal, untilted position, the tip of screw 46 does not touch cylindrical wall 47 of disc 42. When screw 46 is turned inwardly, lever 43 pushes upwardly one side of disc 41, bringing it to an oblique position as shown in FIG. 9.

Figure 11:
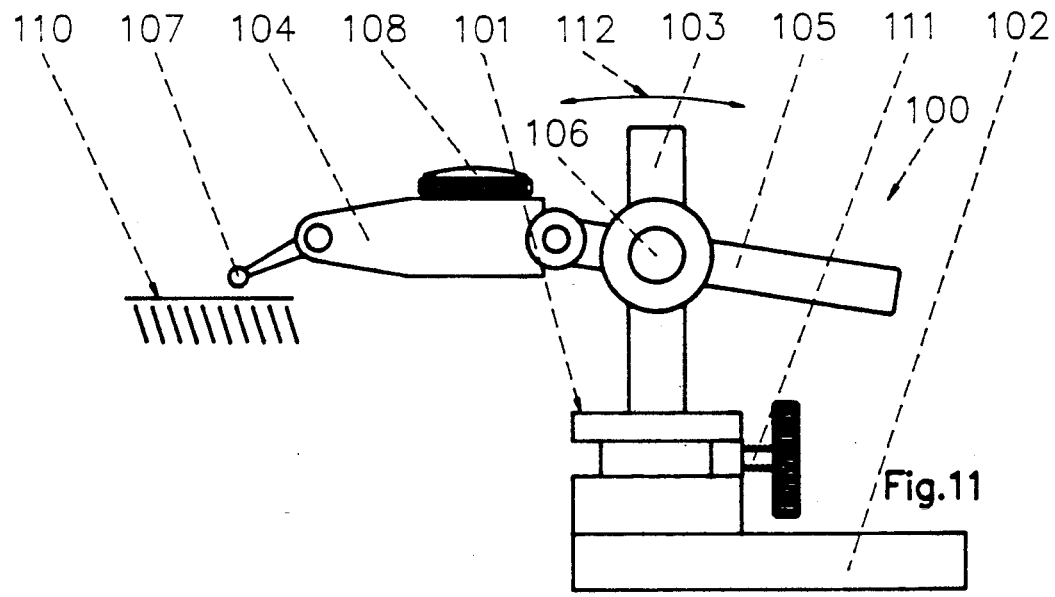
FIG. 11 is a side view of a dial test indicator according to the invention.
Figure 12:
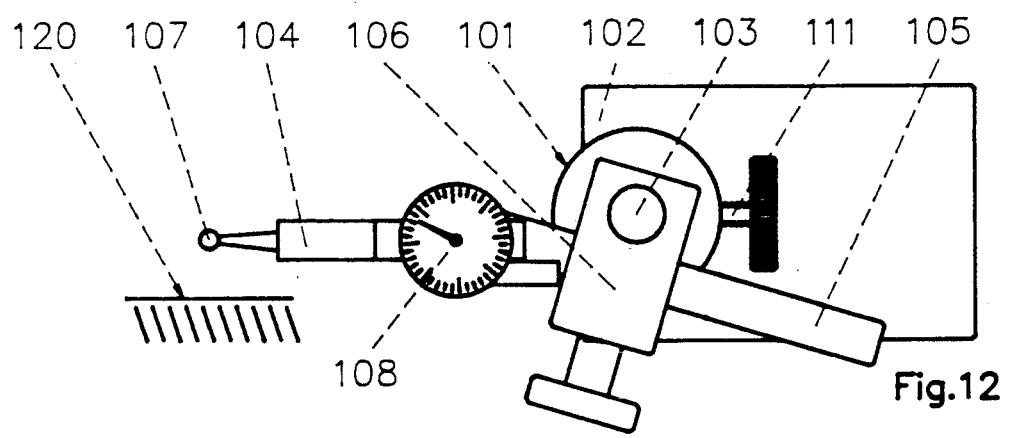
FIG. 12 is a top view of the dial test indicator shown in FIG. 11.
Figure 13:
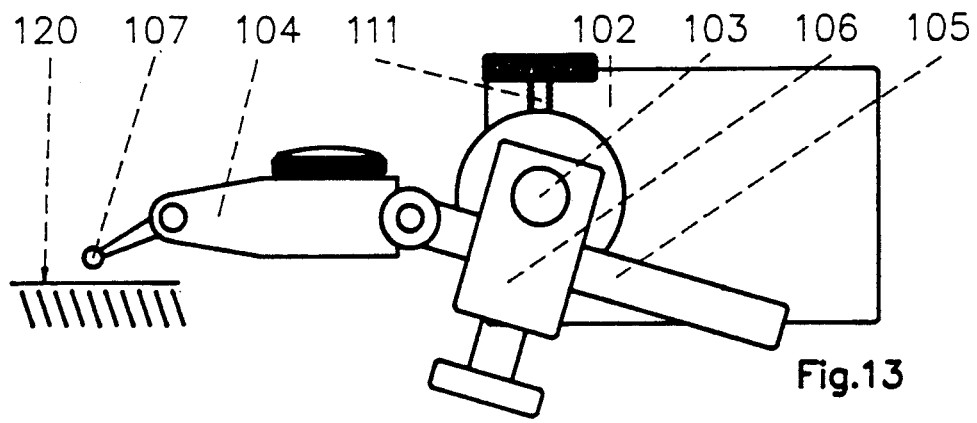
FIG. 13 is a top view of a dial test indicator shown in FIGS. 11 and 12 when the tilting means are positioned at right angle to the position shown in FIG. 12.

FIGS. 11 to 13 show two different settings of a dial test indicator set up on a measuring stand utilizing the fine adjustment unit shown in FIGS. 5 and 6.

FIGS. 11 and 12 show, respectively, a side view and a top view of the fine adjustment as applied to a complete setup 100 to make measurements with a dial test indicator 104. The round fine adjustment assembly 101 provided with fine adjustment screw 111 is permanently mounted on a base-plate 102. A rod 103 os rigidly attached to the top plate of fine adjustment assembly 101. Test indicator 104 provided with measuring tip 107 and dial 108 is adjustably attached to a generally horizontal rod 105, the latter being clamped to rod 103 by means of a swivel clamp 106. This setup allows the test indicator to be brought approximately to the desired position. Subsequently, the measuring tip 107 of the test indicator, by utilizing the fine adjustment assembly 101, is brought into contact with surface 110 to be measured.

As shown in FIG. 11, test indicator 104 has been brought close to the measuring position. When fine adjustment screw 111 is actuated, rod 103 can tilt in the direction of the arrows 112 thus moving rod 105 and test indicator 104, allowing indicator 104 to be brought closer to the surface to be measured, until contact of tip 107 to surface 110 is made as desired.

When a surface 120, normal to surface 110 has to be measured, test indicator 104 must be rotated by 90 degrees to the position as shown in FIG. 13. A fine adjustment of test indicator 104 relative to surface 120 can be achieved without moving base-plate 102, by rotating fine adjustment screw 111 and the wedge in their circular track, to a position as shown in FIG. 13, where it is approximately at right angles to the direction of movement which is needed to bring contact tip 107 of test indicator 104 to the desired position. In such setting, actuation of the fine adjustment screw 111 will move test indicator 104 in the desired direction towards surface 120.

Thus, since the fine adjustment screw together with the wedge can be rotated in their circular track to any desired position, it is possible to obtain a direction of movement for the fine adjustment, that will fill almost any need that may occur.

We claim:

1. A multi-directional fine adjustment unit comprising two discs held coaxially adjacent to each other by connecting means located along the axes of the discs, a circumferential annular track in at least one of the discs at least partially defined by a lower surface of one disc and an upper surface of the other disc, and tilting means for tilting one disc relative to the other wherein said tilting means is located in said circumferential annular track wherein said tilting means may assume any position along the track.

2. A fine adjustment unit according to claim 1 wherein the annular track has the shape of an outwardly tapering annular dovetail, the tapering sides of which are formed in facing portions respectively of said discs and said tilting means comprise a wedge of cross-section matching said track and means for adjusting the position of said wedge in said track in the radial direction.

3. A fine adjustment means according to claim 1, wherein the annular track comprises a circumferentially extending groove formed in a surface of only one of said discs normal to the axis thereof and a facing surface of one of said other discs and said tilting means include a lever provided with pin means which engage in said groove of said one disc and a part engaging said facing surface of one of said other disc and means for tilting said level about said groove.

4. A fine adjustment unit according to claim 1, wherein said unit forms part of a dial test indicator.

5. A fine adjustment unit according to claim 1, wherein the annular track tapers inwardly in the radially outward direction, at least one tapering side of which is formed in one facing portion of one of the discs and said tilting means comprise a wedge of cross-section matching said track and means for adjusting the position of said wedge in said track in the radial direction.

6. A fine adjustment means according to claim 1, wherein the annular track comprises a circumferentially extending groove formed in a surface of at least one of said discs normal to the axis thereof and a facing surface of one of said other discs and said tilting means include a lever provided with pin means which engage in said groove of said one disc and a part engaging said facing surface of one of said other disc and means for tilting said lever about said groove.

* * * * *